US009001681B2

(12) United States Patent
Cortes Gomez et al.

(10) Patent No.: US 9,001,681 B2

(45) Date of Patent: Apr. 7, 2015

(54) METHOD FOR ALLOCATING A NETWORK ENTITY

(75) Inventors: Francisco Cortes Gomez, Würselen (DE); Lars Frid, Danderyd (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 255 days.

(21) Appl. No.: 13/639,913

(22) PCT Filed: Apr. 9, 2010

(86) PCT No.: PCT/EP2010/054709

§ 371 (c)(1), (2), (4) Date: Jan. 22, 2013

(87) PCT Pub. No.: WO2011/124264

PCT Pub. Date: Oct. 13, 2011

(65) Prior Publication Data

US 2013/0201845 A1 Aug. 8, 2013

(51) Int. Cl.

| | |
|---|---|
| ***H04L 12/28*** | (2006.01) |
| ***H04W 4/00*** | (2009.01) |
| ***H04W 48/18*** | (2009.01) |
| ***H04W 48/00*** | (2009.01) |
| *H04W 8/18* | (2009.01) |
| *H04W 28/08* | (2009.01) |

(52) U.S. Cl.

CPC .............. *H04W 48/18* (2013.01); *H04W 48/17* (2013.01); *H04W 8/18* (2013.01); *H04W 28/08* (2013.01)

(58) Field of Classification Search

USPC .......................... 370/234, 252, 254–255, 331

See application file for complete search history.

(56) References Cited

U.S. PATENT DOCUMENTS

| | | | | |
|---|---|---|---|---|
| 5,835,490 | A * | 11/1998 | Park et al. | 370/342 |
| 7,639,710 | B1 | 12/2009 | Stine et al. | |
| 2003/0169712 | A1* | 9/2003 | Tsao | 370/338 |
| 2009/0016215 | A1* | 1/2009 | Nadas et al. | 370/230 |
| 2009/0252133 | A1 | 10/2009 | Watanabe et al. | |
| 2011/0243074 | A1* | 10/2011 | Shin et al. | 370/329 |

* cited by examiner

*Primary Examiner* — Warner Wong

(74) *Attorney, Agent, or Firm* — Coats & Bennett, PLLC

(57) ABSTRACT

The invention relates to a method for allocating a network entity for handling user communication signals of a user, the user communication signals comprising payload and signalling load. The method comprises obtaining (801) a load attribute, the load attribute indicating a load ratio between the payload and the signalling load, selecting (803) a network entity upon the basis of the load attribute, and initiating (805) a network entity location procedure to allocate the selected network entity for handling the user communication signals.

25 Claims, 10 Drawing Sheets

Central Data Storage
109
1c Attach
2 Load attribute = P
4
GW (S)
113
111
GW (P)
3b location
NCE
107
3a location
1b Attach
Access Node
105
4
1a Attach
UE
101
103
User communication signals

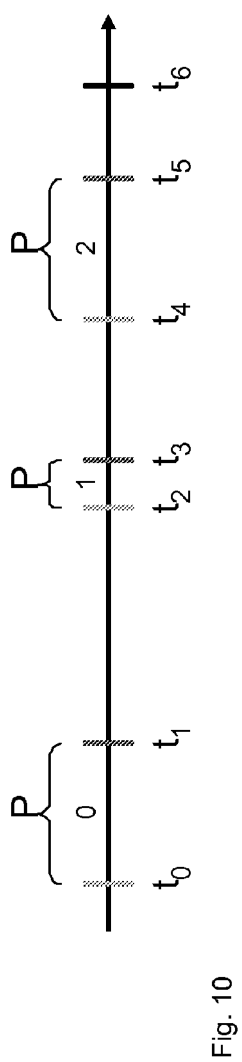
Fig. 10
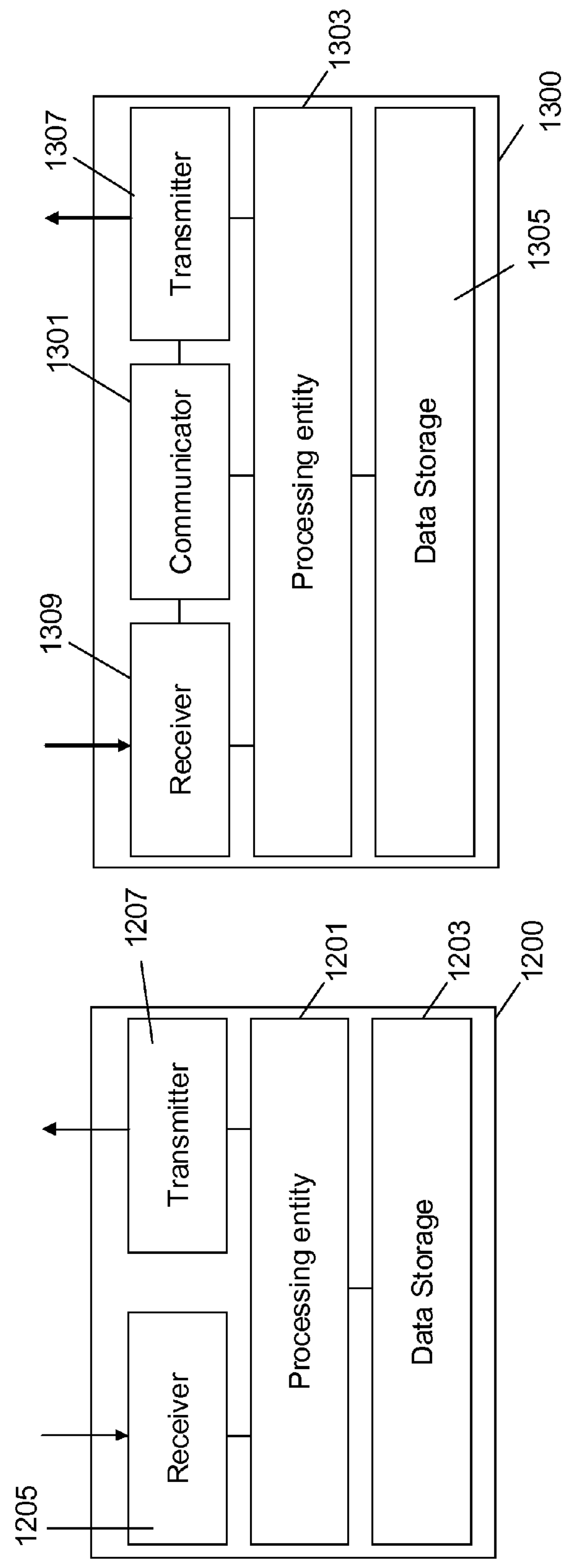
Fig. 12
Fig. 13

METHOD FOR ALLOCATING A NETWORK ENTITY

TECHNICAL FIELD

The present invention pertains to communication systems.

BACKGROUND

In order to support transmissions of different services such as audio data or video data towards different recipients residing in e.g. different countries, efficient communication networks are necessary. An efficient horizontally layered architecture is e.g. described in "Control Servers in the Core Network", Ericsson Review No. 4, 2000. By way of example, the layered network architecture as e.g. introduced with release for of the 3GPP (3rd Generation Partnership Project) specification comprises three distinct layers: an application layer, a network control layer and a connectivity layer. The application layer supports end-user applications and may be implemented in mobile stations or application servers in the network. The application layer may interface with the network layer via a set of application program interfaces (API) which enables designing and implementing different services and applications. The network control layer supports communicating services across e.g. different types of networks such as circuit-switched domain networks based on the GSM standard using e.g. an ISDN-related technology or packet-switched networks employing e.g. the GPRS technology. The connectivity layer is a transport layer capable of transporting any type of service via e.g. voice, data and multimedia streams.

According to the UMTS (Universal Mobile Telecommunications System) technology, the control layer may comprise a mobile switching center (MSC) handling control layer functions at an interface between an access network and a core network. The communication between the access network and the MSC server may be performed upon the basis of RANAP messages (Radio Access Network Application Protocol). The network control layer according to the UMTS technology may further comprise a transit switching center (TSC) managing communications between the core network and another network such as e.g. ISDN (Integrated Services Digital Network) or PSTN (Public Switched Telephone Network) network. The MSC and the TSC may communicate via gateway control protocol (GCP) messages with a respective media gateway (MGW) or mobile MGW (M-MGW) arranged in the connectivity layer for managing data transmissions. Typically, a MGW receives data from a communication entity, such as a mobile station or an application server, via the access network and e.g. converts the ATM (Asynchronous Transfer Mode) data streams into IP (Internet Protocol) data streams for further transport.

Another emerging communication technology for delivering multimedia services across fixed and mobile access networks is provided by the IP Multimedia Subsystem (IMS) technology. The network architecture according to IMS comprises a service layer corresponding to the aforementioned application layer, a control and connectivity layer corresponding to the aforementioned network control layer and an access layer corresponding to the aforementioned connectivity layer. In particular, the control and connectivity layer may comprise call session control functions (CSCF) forming central entities for the provision of the SIP signalling (SIP: Session Initiation Protocol). The control and connectivity layer further comprises a MGCF (Media Gateway Control Function) communicating with the CSCF via SIP messages and with media gateways arranged within the access layer using media gateway messages according to e.g. the H.248 protocol. The control and connectivity layer may further comprise a MRF (Media Resource Function) providing media services e.g. in a home network.

A further emerging communication technology is the Evolved Packet System (EPS) as defined by the 3GPP standards organization. One of the communication technologies deployed within the context of the EPS is the LTE access technology (LTE: Long Term Evolution). The EPS comprises a MME (Mobility Management Entity) forming a control-entity suitable for signalling and selecting a serving gateway (SGW) which routes and forwards user data packets is provided. The MME and the SGW are parts of an Evolved Packet Core (EPC) which comprises further elements such as SGSN (Serving GPRS Support Entity) or PGW (Packet Data Network Gateway).

With exemplary reference to the afore-mentioned communication technologies, a number of network entities may handle a significant number of user communication signals relating to a user and, respectively, comprising payload and signalling load. However, some of these network entities are mainly affected by signalling load and signalling-load-related procedures, while other entities are mainly concerned with payload and payload—related procedures. Therefore, the available network resources may be not efficiently exploited when e.g. a network entity mainly handling signalling load also is provided with a capability of handling payload.

SUMMARY

The invention is based on the finding that network resources may be more efficiently exploited when payload intensive user communication signals are directed towards payload optimized network entities, and, conversely, when signalling load intensive user communication signals are directed towards signalling-optimized network entities.

According to an aspect, the invention relates to a method for allocating a network entity for handling user communication signals of a user. The user communication signals comprise payload and signalling load. The method comprises obtaining a load attribute. The load attribute indicates a load ratio between the payload and the signalling load. The method further comprises selecting a network entity for handling the user communication signals of the user upon the basis of the load attribute and initiating a network entity location procedure to allocate the selected network entity for handling the user communication signals.

According to a further aspect, the invention relates to a method for handling user communication signals of a user, the user communication signals comprising payload and signalling load. The method comprises communicating a user communication signal of the user. The user communication signal comprises signalling load and payload. The method further comprises determining a load attribute upon the basis of the user communication signal and transmitting the load attribute towards a network control entity which is capable of initiating a network entity location procedure based on the load attribute. In order to communicate the user communication signal, the user communication signal may be transmitted or received over a communication network.

According to a further aspect, the invention relates to a network control entity for allocating a network entity for handling user communication signals of a user. The user communication signals comprise payload and signalling load. The network control entity comprises a processing entity for obtaining a load attribute. The load attribute indicates a load ratio between the payload and the signalling load. The processing entity is further configured to select a network entity for handling the user communication signals of the user upon the basis of the load attribute and to initiate a network entity location procedure to allocate the selected network entity for handling the user communication signals.

Further features of the network control entity are directly derivable from the features of the methods for allocating the network entity. Method features associated with any processing of data, e.g. such as relating, initiating, determining, selecting, retrieving, storing, etc., may be thus performed by the processing entity. Method features associated with receiving of data may be performed by a receiver, method features associated with transmitting of data may be performed by a transmitter, and method features associated with at least one of retrieving and storing of data may be performed by retrieving said data from the data storage respectively storing said data at the data storage. A network control entity may thus comprise in addition to the processing entity at least one further entity of a group of entities comprising a transmitter, a receiver, and a data storage with the processing entity being configured to communicate data with the at least one further entity.

According to a further aspect, the invention relates to a network entity for handling user communication signals of a user, the user communication signals comprising payload and signalling load. The network entity comprises a communicator for communicating a user communication signal of the user. The user communication signal comprises signalling load and payload. The network entity further comprises a processing entity for determining upon the basis of the user communication signal a load attribute, the load attribute indicating a load ratio between the payload and the signalling load, and a transmitter for transmitting the load attribute towards a network control entity which is capable of initiating a network entity location procedure based on the load attribute.

Further features of the network entity are directly derivable from the features of the corresponding methods for handling user communication signals. Method features associated with communication of data, in particular data related to the user communication signal, may be performed by the communicator. Method features associated with any processing of data, e.g. such as relating, initiating, determining, selecting, retrieving, storing, etc., may be thus performed by the processing entity. Method features associated with transmitting of data may be performed by the transmitter. The processing entity may initiate the transmitting of data, e.g. such as the load attribute, at the transmitter. Method features associated with receiving of data may be performed by a receiver and method features associated with at least one of retrieving and storing of data may be performed by retrieving said data from the data storage respectively storing said data at the data storage. A network entity may thus comprise in addition to the communicator, the processing entity, and the transmitter at least one further entity of a group of entities comprising a receiver and a data storage with the processing entity being configured to communicate data with the at least one further entity. The communicator and at least one of the transmitter and the receiver may be identical, may share common entities, or may be separate.

BRIEF DESCRIPTION OF THE DRAWINGS

Further embodiments will be described with respect to the following features, in which:

FIG. 10 shows a bearer timeline according to an embodiment;

FIG. 12 shows a block diagram of a network control entity according to an embodiment; and FIG. 13 shows a block diagram of a network entity according to an embodiment.

DETAILED DESCRIPTION

Figure 1:
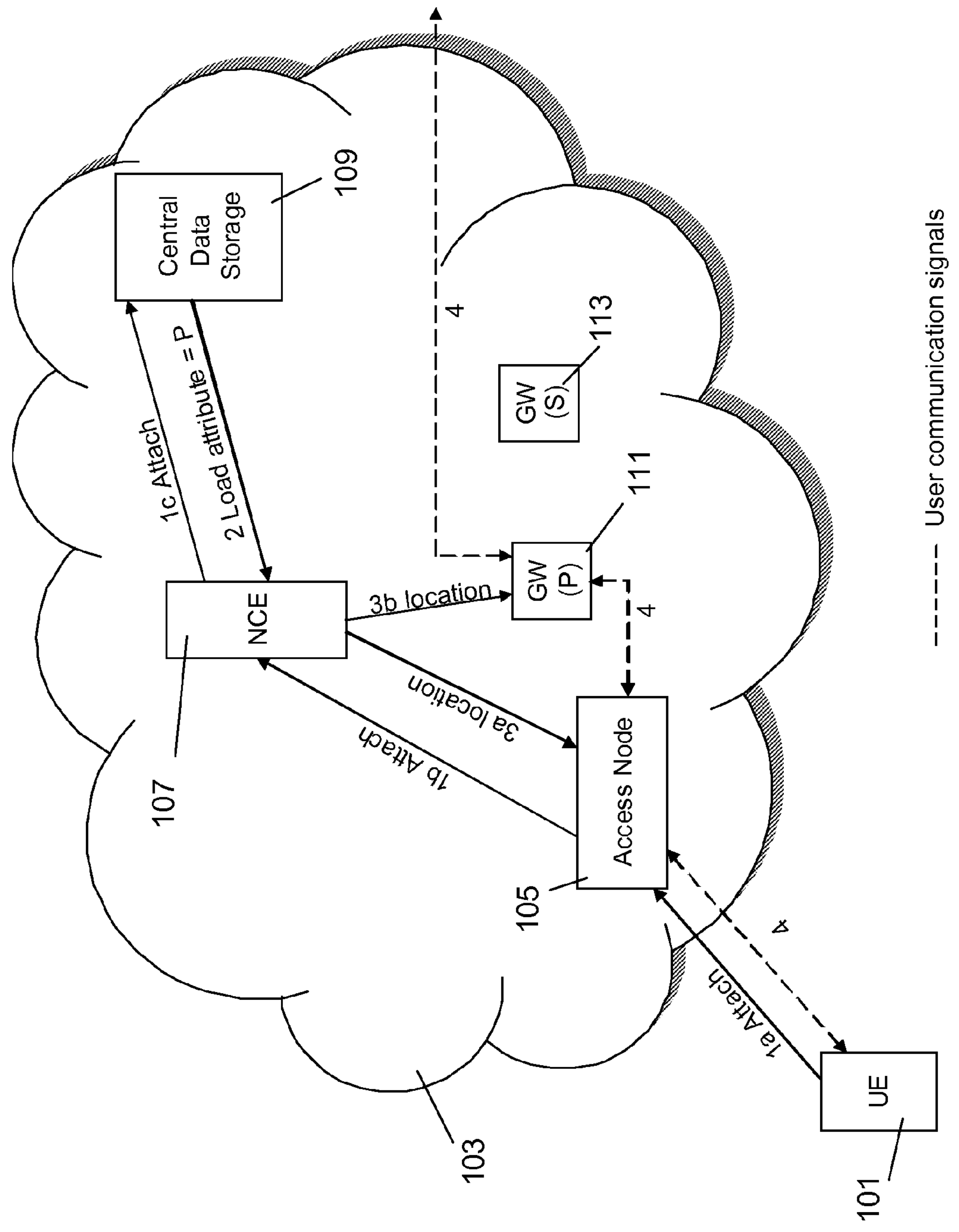
FIG. 1 shows a block diagram of a communication system according to an embodiment.

In order to illustrate the network entity location approach, the EPS mobile communication system as defined by the 3GPP standards organization may exemplarily be addressed. According to the EPS mobile communication system, a number of network entities, such network gateways or other nodes of a communication network that handle user communication comprising payload and signalling load and that can be allocated by a location and/or relocation procedure, may handle a number of users. However, some of these entities are only affected by signalling procedures related to each user, while other do carry and/or switch and/or route the payload with a more limited impact from signalling procedures. Focussing on the main entities defined by the EPC architecture, the network entities may be thus classified according to the processing impact caused by signalling load intensive and payload intensive user communication signals. In this regard, a user communication signal may be determined as signalling load intensive if the signalling impact is greater than the payload impact on the network entity. Conversely, a user communication signal may be determined as payload intensive if a payload impact is greater than a signalling impact on a network entity which is exemplarily summarized in the following table.

| Network Entity Type | Signalling Impact | Payload Impact |
|---|---|---|
| SGSN (Serving GPRS Support Node) | High | High/Medium |
| GGSN (Gateway GPRS Support Node) | Low | High |
| MME (Mobility Management Entity) | High | None |
| SGW (Serving Gateway) | Medium | High |
| PGW (Packet Data Network Gateway) | Low | High |
| Combined SGW + PGW | Medium | High |

The above classification is, by way of example, generic, and may also be affected by standard-related parameters, e.g. by the deployment of 3G Direct Tunnel (3GDT) in the SGSN case. The usage of 3GDT may reduce the payload impact on the SGSN, which is reflected by the "medium" category in the above table, while the signalling impact on the GGSN may increase depending on the quality the assignment of users using 3GDT. Another parameter is the subscriber, i.e. the user, behaviour. In this regard, some users are payload intensive with a rather low proportion of signalling load, and other users may create a higher proportion of signalling load than payload. Thus, allocating e.g. payload intensive users to network entities which are optimized for payload processing may provide an efficient measure for efficiently exploiting the available network resources.

In order to obtain signalling load optimized and/or payload optimized network entities, the existing SGW and PGW implementations may be optimized for certain proportion, i.e. certain load ratio, of signalling versus payload capacity. This optimization may be flexible, which may be achieved by using e.g. different card types, different hardware or different software for signalling and for payload. Furthermore, the network entities may be adapted to be configurable according to the specific user characteristic with regard to signalling load or to payload. By way of example, in order to support high payloads, the payload optimized network entities may require an optimized back/switching-plane, which affects the maximum payload supported, while at the same time representing baseline cost which becomes overhead if the entities are configured predominantly for signalling. Conversely, high signalling capacity may be associated with different HW (Hardware) requirements than payload intensive implementations, so that using common HW for both often represents unnecessary HW costs if the boards are to be used mainly for payload. This may render the SW-based flexibility between signalling and payload capacity inherently more expensive than HW based configurations. Thus, hardware-based re-balancing between signalling and payload capacity may imply considerable OPEX (Operational Expenditure) costs for potentially increased number of entities if the overall user behaviour changes with time due to the deployment of new applications or business models. Fortunately, the network entities such as SGWs and PGWs may be optimized for some proportion of signalling load versus payload, for which the flexibility may be limited. Such network entities may specifically be addressed for handling payload intensive or signalling load intensive user communication signals.

The term "payload" referred to herein typically refers to the actual data, or the cargo, which may be carried within a packet or other transmission unit which may further comprise one or more headers. By way of example, the payload may comprise information transmitted towards or from the user. Usually, the payload does not include signalling load. Signalling load may constitute of data required to transmit the payload to its destination or for appropriate processing of the payload. Signalling load is sometimes also denoted as overhead data and can be typically found in headers.

The payload and the signalling load of a user communication signal may be related to each other, e.g. according to the definition of a certain communication protocol. Hence, any indication with respect to the payload or to the signalling load may simultaneously enable deriving information relating to the load ratio between the payload and the signalling load. This information may be carried by a load attribute. A load attribute indicates a load ratio between the payload and the signalling load. The load attribute may be at least one of a user classification, a payload measure, a signalling load measure, and a load ratio, e.g. a quotient build from an amount of payload and an amount of signalling load.

The network entities for handling user communication signals referred to herein may be one of: a Serving Gateway (SGW), a Media Gateway (MGW), and a Packet Data Network Gateway (PGW).

Furthermore, the network control entities for controlling communications of a user referred to herein may be one of: a MME (Mobility Management Entity), a MSC (Mobile Switching Center) or a SGSN (Serving GPRS Support Node), and a MGCF (Media Gateway Control Function).

The terms "transmitter" and "receiver" referred to herein may denote entities which are capable of transmitting or receiving signals from or towards a communication network. However, these terms may also denote protocol entities associated with protocol layers which are adopted to communicate with each other in a peer-to-peer fashion.

FIG. 1 shows an embodiment of a communication system comprising a user entity (UE) 101 which is arranged to communicate over a communication network 103. The communication system further comprises, by way of example, an access node 105 communicating with a network control entity 107 (NCE). The access node 105 may be, by way of example, an Evolved NodeB (eNodeB). The communication system may further comprise a central data storage 109, which may be arranged within a Home Subscriber Server (HSS). The communication system may further comprise a network entity 111, which may be a payload optimized gateway (GW(P)), and a network entity 113, which may be a signalling load optimized gateway (GW(S)).

The embodiment shown in FIG. 1 demonstrates a network entity location procedure at a network attach where the user entity 101 attaches, in step 1*a*, to the communication network 103 via the access entity 105. The access entity 105 forwards, in step 1*b*, the attach request towards the network control entity 107 which may, in step 1*c*, signal the attach request towards the central data storage 109, which may respond with a load attribute indicating e.g. payload intensive communication signals (P) in step 2. The network control entity 107 may, in step 3*a*, indicate a network entity location to the access entity 105, and, in step 3*b*, locate the user entity 101 to the payload optimized network entity 111 which is optimized for payload intensive user communication, and not to the network entity 113 which is optimized for signalling load intensive user communications. Thereafter, in step 4, user communication signals as depicted by the dashed lines are communicated via the access entity 105 and the selected network entity 111 from and/or towards one or more communication entities (inside or outside the communication network 103) which are not shown in FIG. 1.

Figure 2:
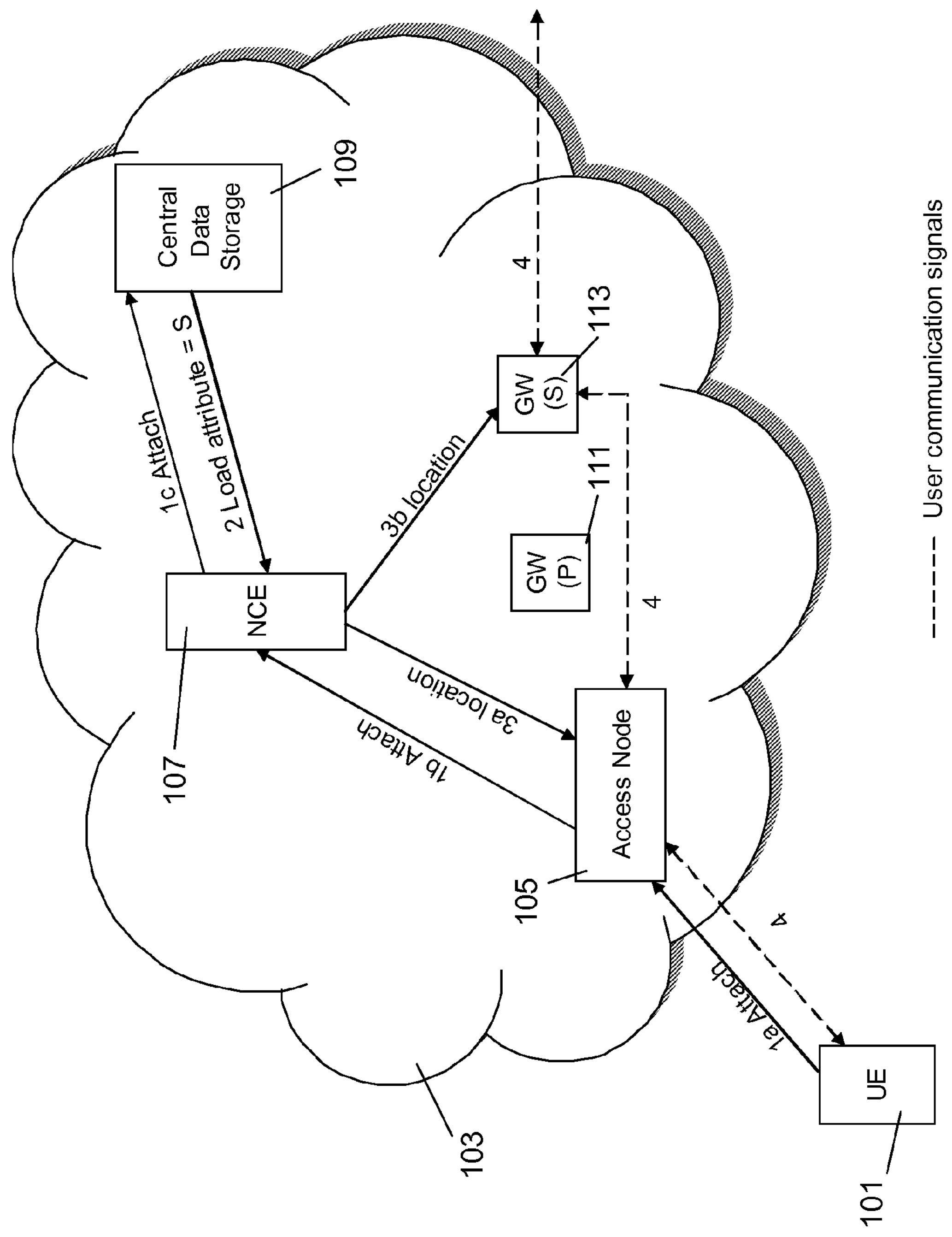
FIG. 2 shows a block diagram of a communication system according to an embodiment.

FIG. 2 shows an embodiment of the communication system. Unlike in the embodiment shown FIG. 1, the user communication signals may be signalling load intensive, so that, in step 2, the central data storage 109 may respond to the attach request of step 1*c* with a load attribute indicating that the user communication signals are rather signaling load intensive (S). Thereafter, the network control entity 107 indicates the network entity location in step 3*a* to the access entity 105, and, in step 3*b*, locates the network entity 113 for handling the user communication signals. Thereafter, in step 4, the signalling load intensive user communication signals, which are depicted by the dashed lines in FIG. 2, are communicated via the access entity 105, and the selected network entity 113 from and/or towards one or more communication entities (inside or outside the communication network 103) which are not shown in FIG. 2.

Figure 3:
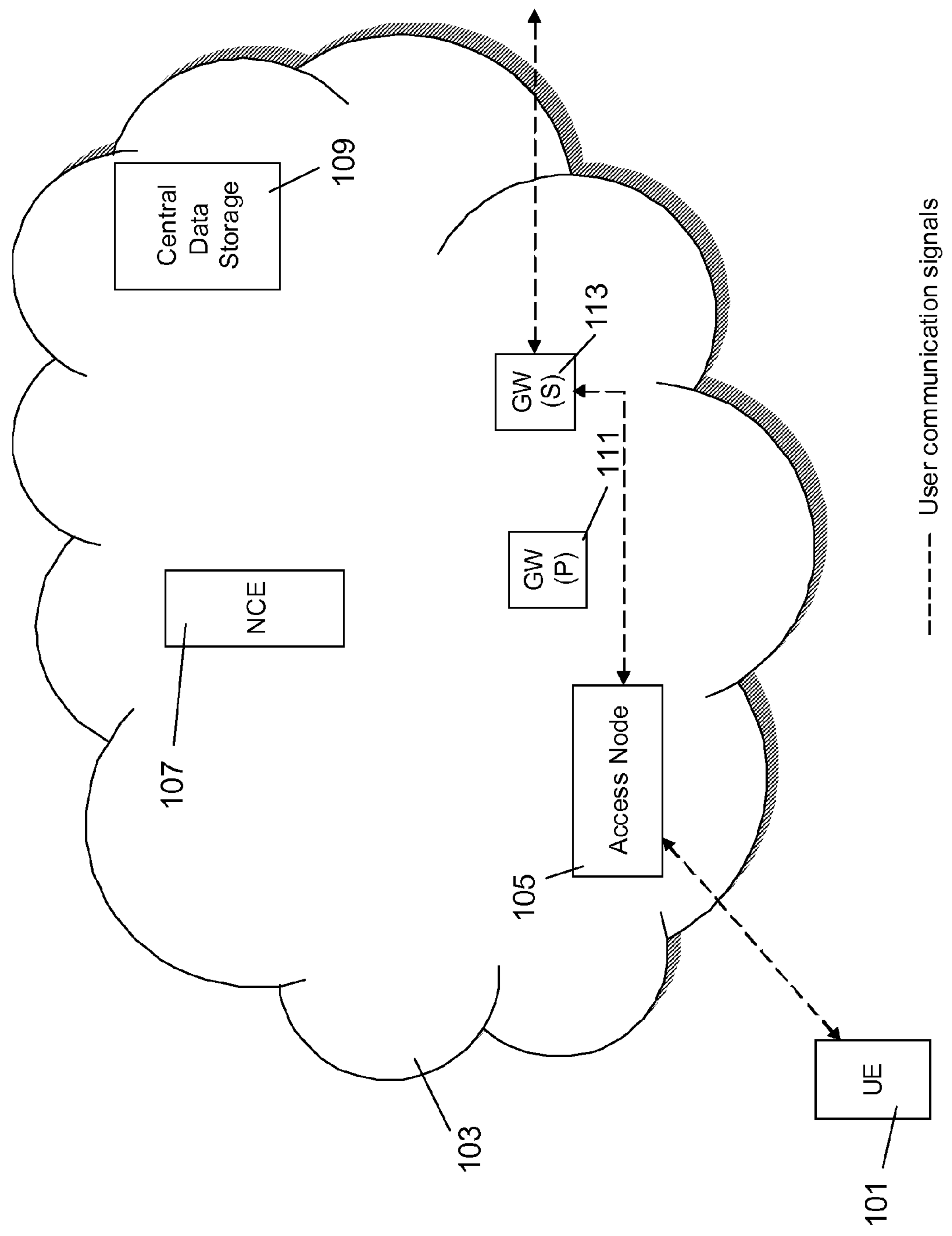
FIG. 3 shows a block diagram of a communication system according to an embodiment.
Figure 4:
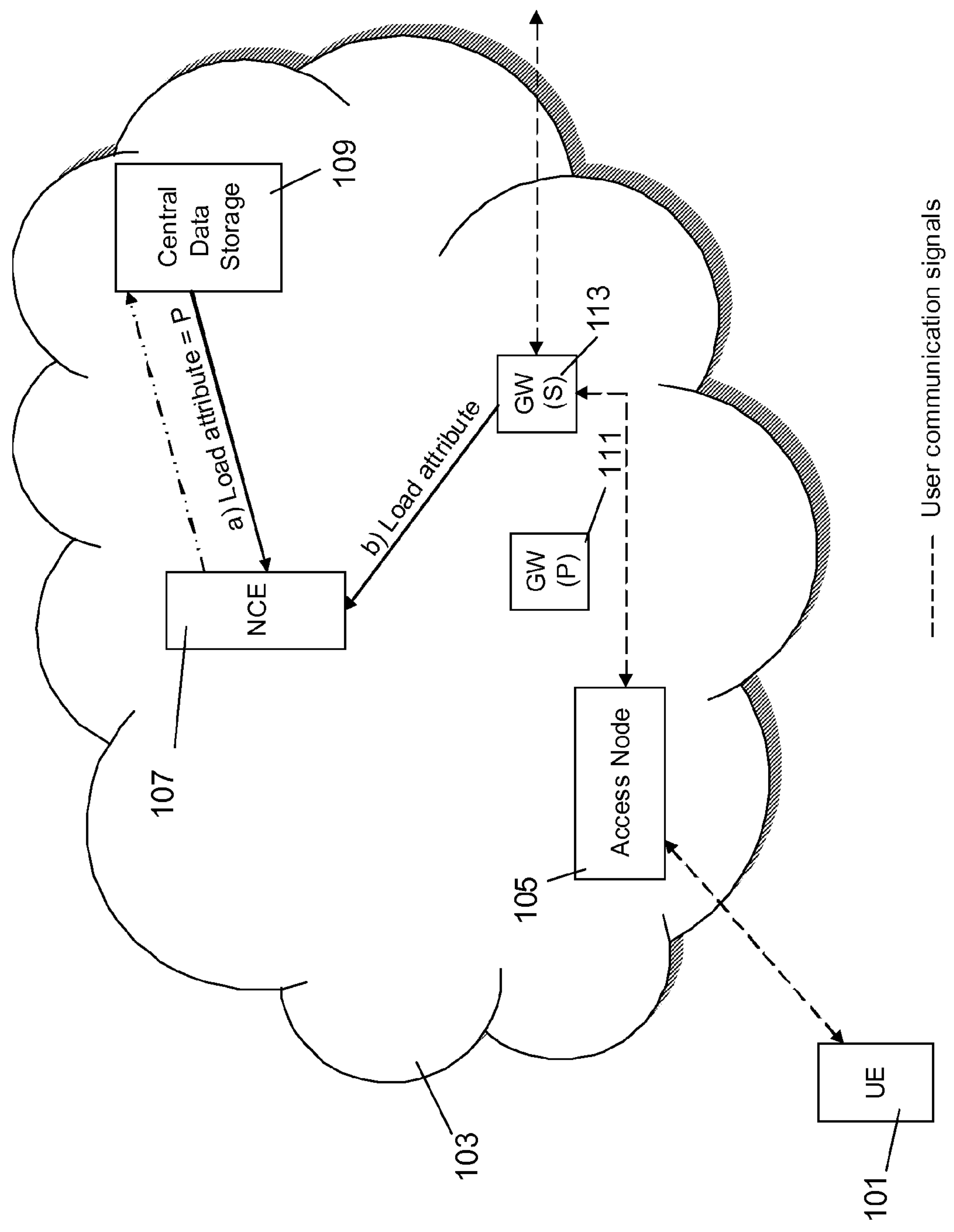
FIG. 4 shows a block diagram of a communication system according to an embodiment.

In FIGS. 3 to 7, a network entity relocation procedure, forming an embodiment of a network entity location procedure, in the communication system as shown in FIGS. 1 and 2 is demonstrated. Starting from FIG. 3, the user entity 101 communicates via the access entity 105 and the signalling load optimized network entity 113 with one or more communication entities (inside or outside the communication network 103) which are not shown in FIG. 3-7. With reference to FIG. 4, the network communication entity 107 may receive from the central data storage 109, according to a scenario a), a load attribute indicating that the user communication signals originating from the user entity 101 are signaling load intensive which may be triggered by a trigger event at the central data storage 109 or by the network control entity 107. In the latter case, the network control entity 107 may request the load attribute from the central data storage 109, as depicted by the dashed-dotted line, which may not be needed for the trigger event in the first case. A trigger event may be e.g. a certain time instant or a location of the user entity 101.

However, according to scenario b) shown in FIG. 4, the load attribute, which may indicate that the user communication signals are payload intensive, may be transmitted by the network entity 113 towards the network control entity 107 in order to indicate e.g. a ratio between the payload and the signalling load, or a payload measure. In the latter case, the network control entity 107 may need to determine the signalling load in order to determine the payload to signalling load ratio. By way of example, the payload to signalling load ratio may be equal to or greater than a threshold, e.g. 50%, indicating that the user communication signals are payload intensive, which may trigger the network control entity 107 to select the payload optimized network entity 111 and to initiate a network entity relocation procedure from the signalling load optimized network entity 113 to the payload optimized network entity 111.

Figure 5:
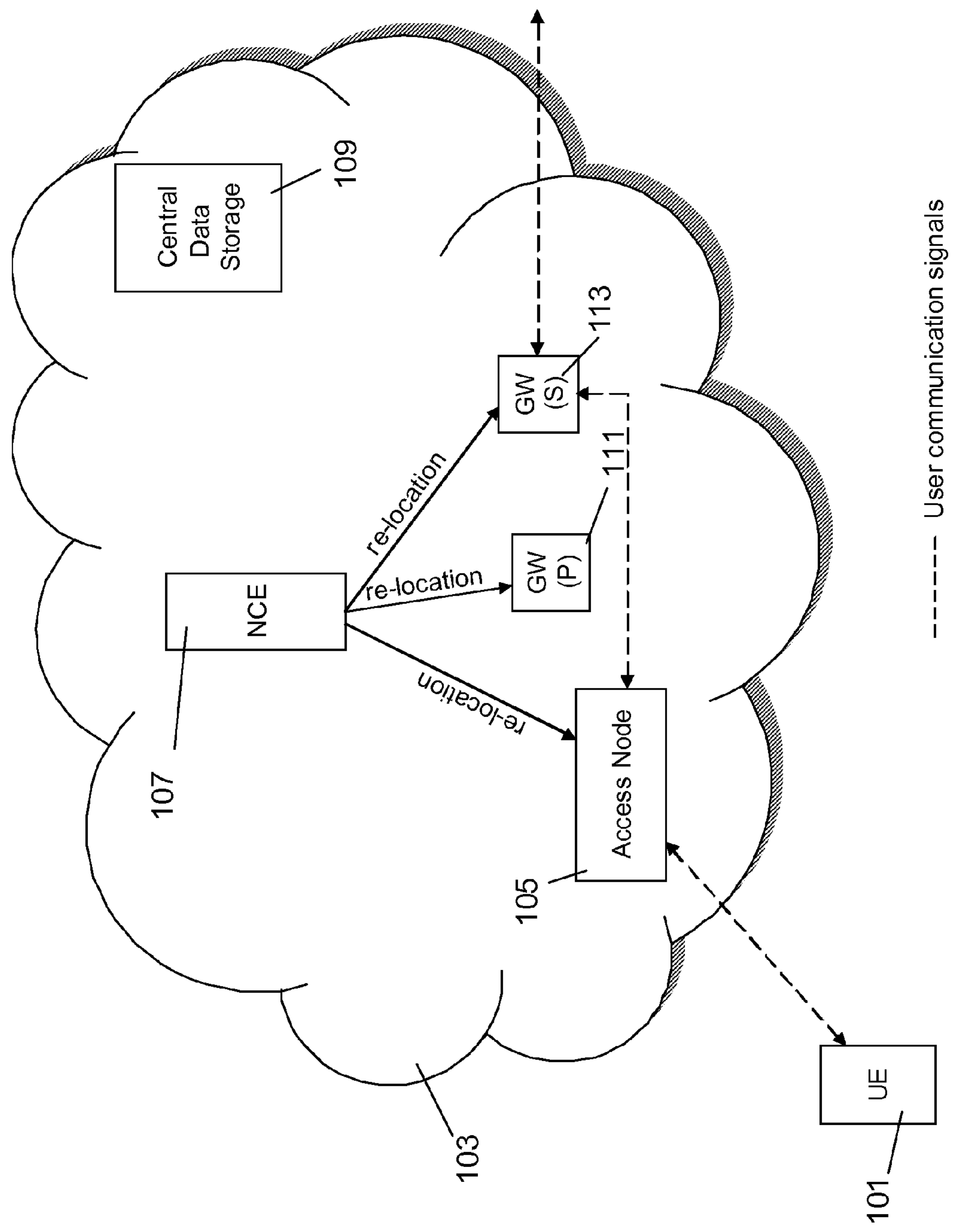
FIG. 5 shows a block diagram of a communication system according to an embodiment.
Figure 6:
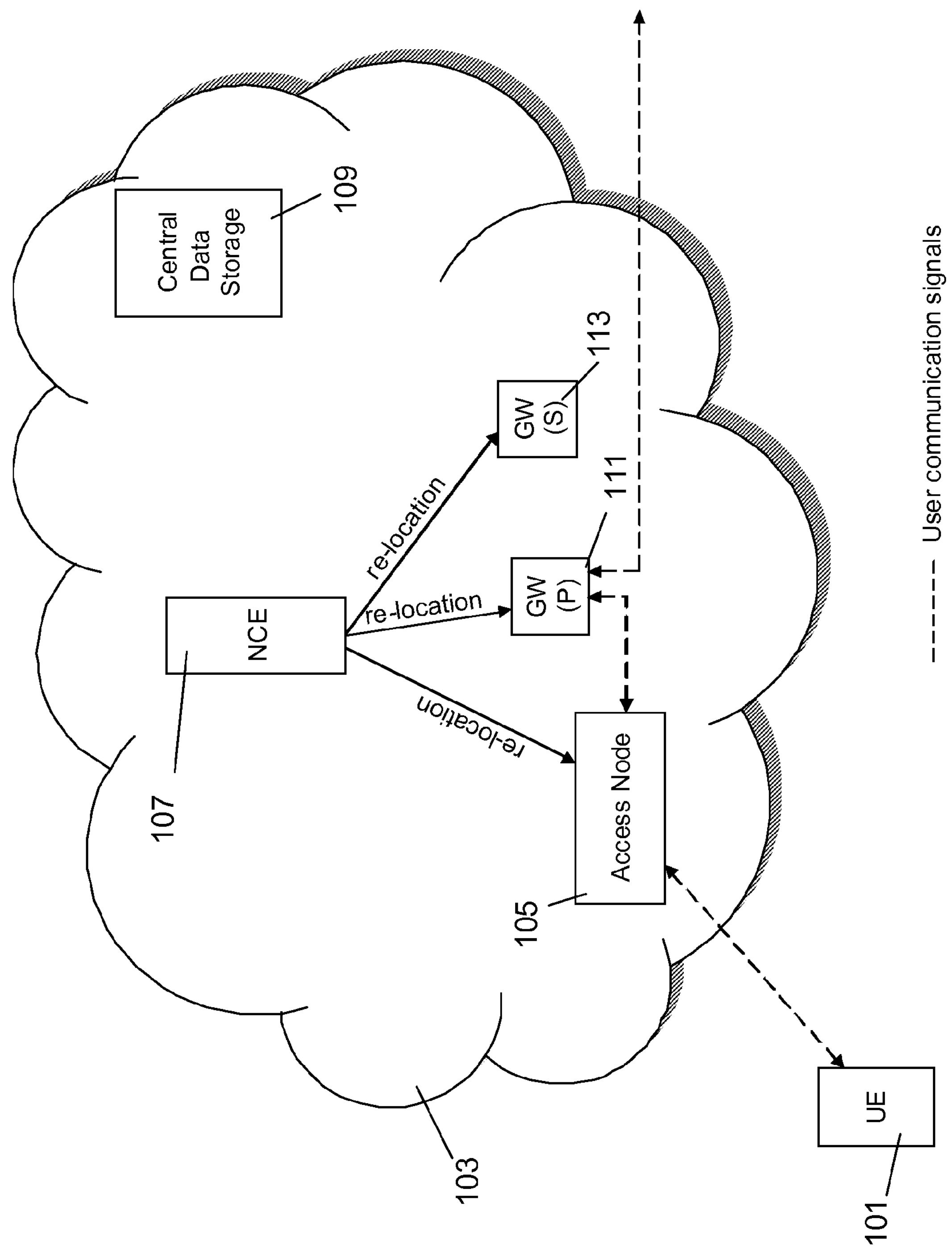
FIG. 6 shows a block diagram of a communication system according to an embodiment.
Figure 7:
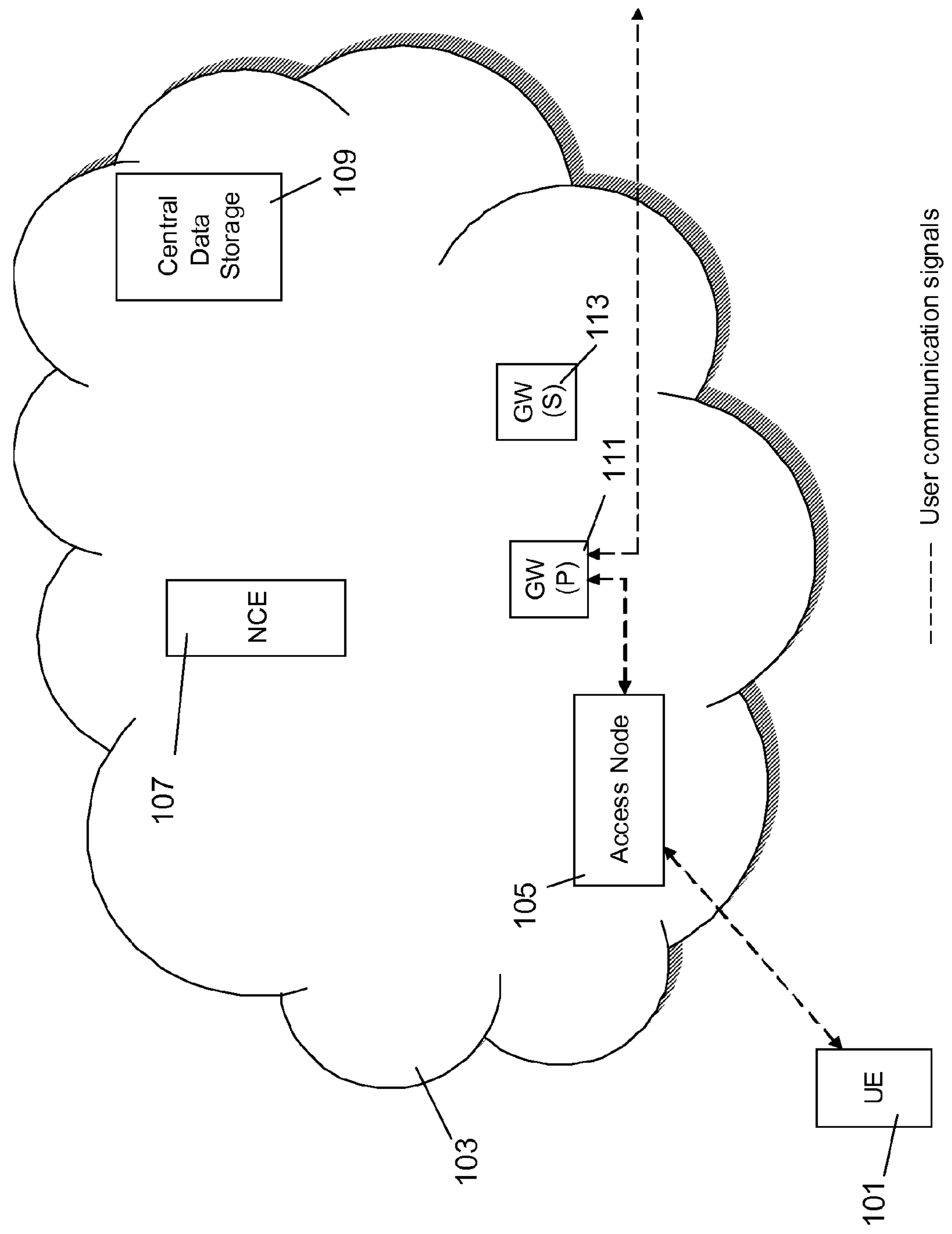
FIG. 7 shows a block diagram of a communication system according to an embodiment.

As shown in FIG. 5, the network control entity 107 may transmit relocation requests towards the network entities 111 and 113 and towards the access entity 105 to redirect (i.e. to release the user communication signals of the user from the current network entity that is currently handling the user communication signals for the user; i.e. network entity 113 as shown in FIG. 3-5, and to allocate the user communication signals of the user to the selected network entity, i.e. network entity 111 as shown in FIGS. 6 and 7) the user communication signals to the payload optimized network entity 111 for further communications, as depicted in FIGS. 6 and 7.

According an embodiment, a GTP Echo Request or Response message, which may not be user specific, may be used for transmitting the load attribute. However, the load attribute may be carried by the Private Extension IE which may include an identifier of the user such as the IMSI (International Mobile Subscriber Identity) or one of the S11 TEIDs or IMEI (International Mobile Station Equipment Identity).

In order to allow a payload optimized network entity 111 to e.g. off-load, i.e. to relocate, signalling load intensive users to the signalling load optimized network entity 113 or vice versa, the network entity 111 may, by way of example, use an existing GTP message over the S11 interface to send information to the network control entity 107 about it. This can be performed as a request to off-load the user, with or without a figure reflecting how much signalling load intensive the user is; or it can be done as a "neutral" figure about signalling/payload intensity, leaving it up to the network control entity 107 how to react on it.

In order to determine whether to send the load attribute, one or different thresholds to trigger sending the load attribute from the network entity 111, 113 to the network control entity 107 may be used. However, the load attribute may always be sent for each user, so that the network control entity 107 may decide which criteria to follow to trigger relocation or a location procedure. In this case, the thresholds are not needed, e.g. present thresholds may be omitted.

According to an embodiment, the thresholds may depend on or relate to a network entity load rather than on user-related parameters. By way of example, the network entity 111, 113, when being close to the limits of its signalling capacity may send information to the network control entity 107 about the most signalling load intensive users which may trigger or initiate their relocation. If the network entity 111, 113 is far away from its load limits, then the network entity 111, 113 may refrain from sending any information regardless of how signalling load intensive the current users, i.e. the communication signals of those users, are.

According to an embodiment, users of signalling load optimized versus payload optimized network entities such as network entities may be distributed, e.g. relocated, upon the basis of following implementations:

By way of example, a function or a monitoring entity in the network entity 111, 113 may monitor the behaviour of each user using it, and, based e.g. on configurable thresholds and/or criteria, may inform the network control entity 107 to which the user is connected about how payload intensive the user is or has been for e.g. a configurable period of time. In this regard, an enhancement to the S11 and S4 interface may be provided to enable the transmission of that information, which forms an embodiment of the load attribute, from the network entity 111, 113 to the network control entity 107. By way of example, this enhancement may be a GTP IE of type "Private Extension" within an already existing message, so that it does not require any standardization while keeping the protocol and interface compatible to the 3GPP.

Another implementation may be directed to a function on the network control entity 107 which, based on this information from the network entity 111, 113 and other configurable parameters, may trigger a network entity relocation procedure to move the user from e.g. the network entity 111 to the network entity 113 serving the same service area. By way of example, the network entity relocation procedure may be a standardized procedure according to e.g. the 3GPP standard.

According to an embodiment, the network control entity 107 may trigger the network entity relocation by one of the following procedures according to the as 3GPP TS 23.401 standard:

- Tracking Area Update procedure with serving GW change; and/or
- X2-based handover with serving GW relocation; and/or
- S1-based handover.

The above-mentioned implementations may allow a 3GPP compliant implementation as they can be reused exactly as specified by 3GPP standards without any change at all. The conditions to trigger a change of the currently serving GW may depend upon the implementation of the network control entity 107 so that standard compliance may not be restricted.

According to an embodiment, the network control entity 107 may wait for a next trigger of a normal "Tracking Area Update", "X2-based handover" or "S1-based handover", and may then choose the variant "with Serving GW change" over the without Serving GW change one. Furthermore, a Serving GW change may take place even if the current, i.e. old, network entity 111, 113 may still be used, so that e.g. a 3GPP compliance on interoperability with any implementation of the "new network entity" regardless of the implementation forms described herein may be achieved.

A further functionality may be the central data storage 109 on the network, for instance on the network control entity 107 or in the HSS, where e.g. a user classification forming an embodiment of a load attribute may be stored. The user classification may be transmitted towards the HSS by the network control entity 107, by way of example. Based on the stored user classification, users may be assigned to the appropriate type of network entity already at attach or PDN connection activation, as well as for network entity relocations triggered by change of network entity service area or other invention-independent reasons.

According to an embodiment, the network control entity 107 may also store the load attribute comprising e.g. information on how signalling load or payload intensive a user, i.e. user communication signals of that user, is, so that the user may also be assigned directly to the suitable type of the network entity 111, 113 at e.g. the eUTRAN (Evolved UMTS Terrestrial Radio Access Network) attach, at a PDN connection activation, or in combination with a network entity relocation triggered by change of service area or other reasons. In this regard, the following implementations may be taken into account:

The network control entity 107 may store the load attribute locally in a local storage or centrally in a central storage. The local storage approach may be used during a network entity relocation triggered by any event of a group of defined events, or only if a future attach or PDN connection activation uses the same network control entity 107. The central storage approach, for instance in a HSS, or in a dedicated entity, provides for an access by a plurality of network control entities 107 in the network.

According to an embodiment, the network control entity 107 may store the load attribute in addition, or instead of triggering the network entity location or relocation procedure. Both actions may be performed independently from each other. According to an embodiment, only one of these two actions may be performed. According to a further embodiment, only the storage function may be used, wherein using the information for attach or PDN connection activation may yield a reduction of the signalling overhead of additional network entity relocations.

According to an embodiment, the central data storage 109 in the HSS may be provided with an extension of the S6a interface similar to the usage of a private extension IE that may be used for the S11 interface to transmit the load attribute.

When a connection between the access entity 105, e.g. eNodeB, and the network entity 111, 113 is released, then a S1-bearer release may be performed which is a signalling operation according to some network entity implementations. By way of example, when addressing e.g. network entity service areas or a considerable proportion of static or low-mobility users, the mobility related signalling load on the network entity 111, 113 may be regarded as being small when compared to the bearer setup-release related load and the memory occupation per user.

By way of example, a measurement on how signalling load versus payload intensive a particular user is may be performed by the network entity 111, 113 by measuring the characteristics of the payload sent during the life-time of each S1-bearer, i.e. between S1-bearer setup and release pairs. According to an embodiment, the mobility signalling may also be neglected in this respect. A result of the measurement may be a load attribute or a measure from which the load attribute may be derived.

According to an embodiment, the network control entity 107 may already have information on how signalling load intensive a user, i.e. user communication signals of that user, is, given that some or all S1-bearer release/setup procedures are involved the network control entity 107, as well as all mobility procedures. The same may apply to the SGSN and RAB releases. The network control entity 107 may also have information on how long a bearer has been set up, so that it could calculate e.g. the average load ratio even if the network entity would only communicate the payload, but directly providing the load ratio may be advantageous to simplify an implementation of the network control entity 107.

According to an embodiment, the network entity 111, 113 may inform the network control entity 107, using the load attribute, of the user classification, and, optionally, indicate the signalling load and/or payload usage with a Private Extension IE within for instance one of the following messages: Downlink Data Notification, and/or Modify Bearer Response, and/or Release Access Bearers Response. Thus, the load attribute may be transmitted within a certain field in a transmission frame used to transmit the above-indicated messages.

The network entity 111, 113 may, according to an embodiment, also add the Private Extension IE to other messages. For instance, it may be supported for all possible messages with little implementation impact. The messages listed above are examples of possible messages in case that the implementation changes are limited to as few messages as possible, because they are related to the S1-U bearer setup or release procedures which are potential triggers for the measurements proposed by this invention.

According to an embodiment, it is also possible to piggy-back the load attribute within a GTP message sent for other purposes. Triggering an explicit message for this purpose is possible, but not necessary.

In the following, further embodiments of a network entity, a network control entity, and of corresponding methods for allocating a network entity and for handling user communication signals will be described with reference to FIGS. 8 to 13.

Figure 8:
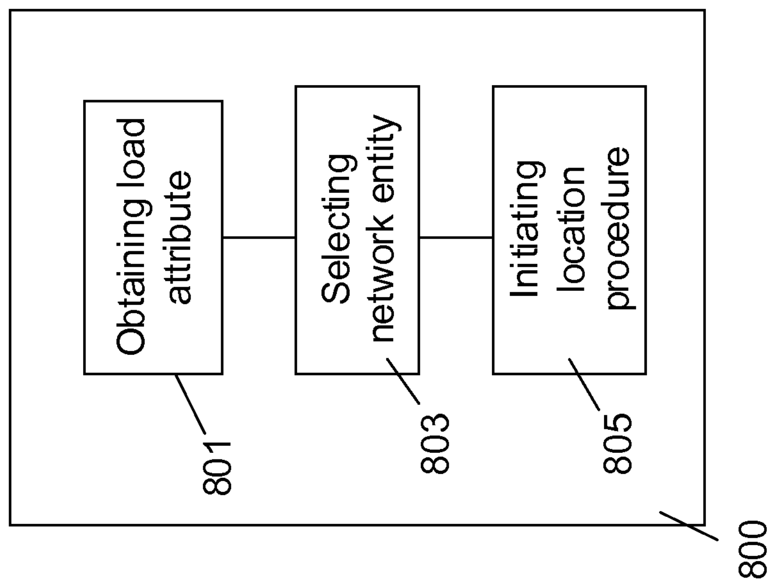
FIG. 8 shows a diagram of a method for allocating a network entity according to an embodiment.

FIG. 8 shows a diagram of a method for allocating a network entity for handling user communication signals of a user. The method comprises obtaining 801 a load attribute indicating a load ratio between a payload and a signalling load, selecting 803 a network entity upon the basis of the load attribute and initiating 105 a location procedure or a relocation to allocate the selected network entity for handling user communication signals. In order to select the network entity, e.g. a network address of the network entity or a network alias of the network entity may be selected.

According to an embodiment, the obtaining 801 the load attribute may comprise at least one of: receiving the load attribute over a communication network from a central data storage, retrieving the load attribute from an internal data storage, and/or generating the load attribute based on retrieved or received information or retrieving the load attribute or to processing the load attribute after reception. The central data storage may be available over a communication network. By way of example, the central data storage may be located in a Home Subscriber Server (HSS). Alternatively or additionally, the load attribute may be stored in the internal data storage which may be located in a network control entity which is capable of initiating a network entity location procedure.

According to an embodiment, the load attribute is at least one of: a user classification indicating whether the user communication signals of the user are signalling load intensive or payload intensive, a payload measure of the payload, a signalling load measure of the signalling load, and a load ratio between a payload measure of the payload and a signalling load measure of the signalling load.

The user classification may comprise a tag indicating whether the user communication signals are signalling load intensive or payload intensive. The user classification may also indicate whether the user communication signals are signalling load or payload intensive generally or typically or within a time period or at a certain time instance. Thereby, the load ratio may be indicated. Correspondingly, the payload measure of the payload and the signalling load measure of the signalling load respectively indicate the load ratio since these measures may depend on each other. The term "measure" may relate to an amount or to a rate.

According to an embodiment, the obtaining 801 the load attribute may comprise receiving the load attribute from a current network entity which is currently handling the user communication signals. The load attribute may be received by a network control entity which is capable of initiating a network entity relocation procedure which forms an embodiment of a network entity location procedure. The network entity location procedure may be a network gateway location procedure if the network entity to be located is a gateway. Correspondingly, the network entity relocation procedure may be a gateway relocation procedure.

According to an embodiment, the load attribute may comprise a payload measure and a signalling load measure, wherein the obtaining 801 the load attribute further comprises relating the received payload measure and the received signalling load measure to determine a load ratio. In order to relate the payload measure and the signalling load measure, e.g. the payload measure may be divided by the signalling load measure or vice versa.

According to an embodiment, the load attribute may comprise a payload measure, wherein the obtaining 801 the load attribute further comprises determining a signalling load measure upon the basis of the payload measure, and/or relating the payload measure and the determined signalling load measure to determine a load ratio. In order to determine the signalling load measure upon the basis of the payload measure, e.g. pre-stored relations between payload measures and signalling load measures may be taken into account.

According to an embodiment, the load attribute may comprise a signalling load measure, wherein the obtaining 801 the load attribute further comprises determining a payload measure of the payload upon the basis of the signalling load measure, and relating the signalling load measure and the determined payload measure. In order to determine the payload measure of the payload upon the basis of the signalling load measure, e.g. a pre-stored relationship between a payload measure and a signalling load measure may be exploited.

According to an embodiment, the network entity location procedure may be initiated in step 805 to allocate the selected network entity upon accessing to a communication network by a user entity communicating the user communication signals. By way of example, the network entity location procedure may be initiated at a first attempt of a user entity to access the communication network.

According to an embodiment, the network entity location procedure may be initiated in step 805 to relocate the user communication signals from a current network entity which is currently handling the user communication signals towards the selected network entity, and wherein the initiating 805 the network entity location procedure comprises releasing the user communication signals of the user from the current network entity that is currently handling the user communication signals for the user, and/or allocating the user communication signals of the user to the selected network entity. Thus, the user communication signals can be re-directed from the current network entity towards the selected network entity which may be able to more efficiently handle the user communication signals.

According to an embodiment, the network entity location procedure may be a relocation procedure for relocating the user communication signals from a current network entity, which is currently handling the user communication signals, towards the selected network entity, and wherein the location procedure is initiated only if the selected network entity and the current network entity are determined to be different network entities. In order to determine that the current network entity and the selected network entity are different, e.g. network addresses of the network entities or any other kind of network entity identifier may be compared.

According to an embodiment, the initiating 805 the network entity location procedure may comprise transmitting the load attribute towards a network control entity which is capable of performing the network entity location procedure. By way of example, the load attribute may be transmitted by the current network entity which handles the user communication signals towards the network control entity in order to e.g. request initiating a network entity relocation procedure which forms an embodiment of a network entity location procedure. However, the load attribute may be transmitted e.g. from a central data storage of a HSS.

According to an embodiment, the method may further comprise determining, upon the basis of the load attribute, whether to initiate the network entity location procedure. In order to decide whether to initiate the network entity location procedure, e.g. a complexity measure may be taken into account, the complexity measure indicating e.g. network costs which are associated with e.g. re-directing the user communication signals towards the selected network entity. The network costs may be determined by an additional overhead associated with additional signalling, by an available bandwidth or by a current load handled by the selected network entity, or by a network load such as processing load at involved network entities and load of links between those involved entities According to an embodiment, the method may further comprise storing the load attribute e.g. in an internal or in a central data storage without initiating 805 the location procedure. Thus, the load attributes may be monitored within a certain period of time in order to avoid unnecessary re-directions of the user communication signals in case of e.g. time-varying load ratios.

According to an embodiment, the selecting 803 the network entity may comprise selecting a payload optimized network entity as the selected network entity if the load attribute indicates that the user communication signals are payload intensive, or selecting a signalling load optimized network entity as the selected network entity if the load attribute indicates that the user communication signals are signalling load intensive. In order to select the payload optimized network entity or the signalling load optimized network entity, a look-up table may be provided in which network entities are characterized as being payload optimized or signalling load optimized.

According to an embodiment, the method may further comprise determining an average load attribute by averaging over a plurality of obtained load attributes, and selecting the network entity upon the basis of the average load attribute. In order to average over the plurality of obtained load attributes, the load attributes may be summed up and divided by a number of obtained load attributes. Further, the load attributes may be weighted using e.g. a forgetting factor in order to reduce an impact of elder, e.g. outdated, load attributes on the current load attribute average.

According to an embodiment, the network entity location procedure may be performed by a network control entity.

Figure 9:
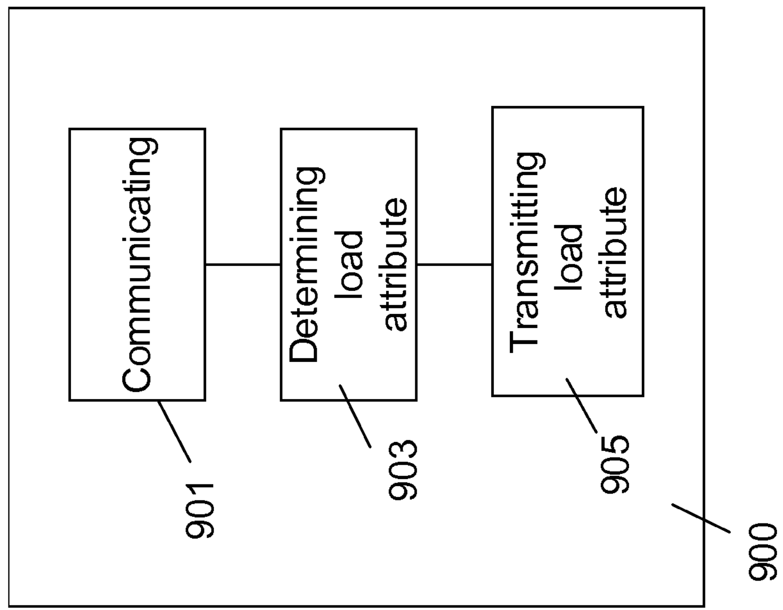
FIG. 9 shows a diagram of a method for handling user communication signals according to an embodiment.

FIG. 9 shows a block diagram of a method for handling user communication signals of a user. The method comprises communicating 901 a user communication signal which is associated with signalling load and with payload, determining 903 a load attribute upon the basis of the user communication signal and transmitting 905 the load attribute towards a network control entity which may initiate a network entity location procedure, e.g. a network entity relocation procedure, based on the load attribute.

The method may further comprise determining as to whether the load attribute fulfils a threshold criterion. In this regard, the load attribute may be compared with a threshold or with a plurality of thresholds, by way of example. The threshold criterion may be fulfilled if the load attribute is below the threshold or if it is above the threshold or if it is equal to the threshold. Furthermore, a counter may be increased or decreased towards the load attribute in order to verify whether the load attribute fulfils the threshold criterion.

According to an embodiment, the load attribute referred to in connection with the embodiment of FIG. 9 may by any load attribute as referred to herein. By way of example, the load attribute may comprise at least one of: a payload measure of the payload, a user classification indicating whether the user communication signals of the user are signalling load intensive or payload intensive, a signalling load measure of the signalling load, and a load ratio between a payload measure of the payload and a signalling load measure of the signalling load.

According to an embodiment, the method may further comprise transmitting 905 the load attribute towards the network controlling entity if the load attribute fulfils the threshold criterion.

According to an embodiment, the method may comprise, if a network entity which is currently handling the user communication signals is optimized for payload processing, transmitting 905 the load attribute if the load attribute indicates that the user communication signals are signalling load intensive, or, if a network entity which is currently handling the user communication signals is optimized for signalling load processing, transmitting 905 the load attribute if the load attribute indicates that the user communication signals are payload intensive. By way of example, the load attribute may be only transmitted if the user communication signals are signalling load intensive and if the current network entity is optimized for payload processing. Correspondingly, the load attribute may be only transmitted if the user communication signals are payload intensive and if the network entity which is currently handling the user communication signals is optimized for signalling load processing. A determination whether a communication signal is payload intensive or signalling load intensive may be performed by comparing a ratio of signalling load and payload to a threshold value.

According to an embodiment, the load attribute may be transmitted in order to request a change of a network entity for handling the user communication signals. Thus, the mere transmission of the load attribute may indicate to e.g. perform the network entity selection and then the network entity relocation procedure.

According to an embodiment, the load attribute may be transmitted in step 905 via a network interface, in particular via a S4 interface or a S11 interface, or via a control protocol, in particular via GTP (GTP: GPRS Tunneling Protocol) or GCP (Gateway Protocol), towards a network control entity. Thus, existing interfaces or protocol messages may be used for transmitting or receiving the load attribute.

According to an embodiment, the load attribute may be transmitted in an extension field of a transmit message frame. By way of example, the load attribute may be arranged in a field of a transmit message frame which is not yet used for other signalling according to the corresponding communication standard upon which the load attribute is communicated. However, the transmit message frames may be enhanced by the extension field in order to transmit the load attribute. The load attribute may be a number or a character or a string of numbers or a string of characters.

By way of example, the network entity and/or the network control entity as described herein may be implemented such that the user communication signals or bearer level GTP messages may carry the Private Extension IE defined by the principles described herein. However, also a new message may be defined for carrying the load attribute. The message may be a GTP message, wherein the GTP header may be used. However, even a message may be used without following the GTP syntax for transmitting the load attribute.

FIG. 10 shows, by way of example, a EPS bearer timeline, wherein the time instants (t0, t2, t4) denote a S1-bearer setup, wherein the time instants (t1, t3, t5) denote a S1-bearer release, and wherein P0, P1, and P2 denote the amount of payload which is sent between adjacent setup and release of the bearer. By way of example, FIG. 10 addresses an arrangement with an MME forming an embodiment of a network control entity and with a SGW forming an embodiment of a network entity. In addition to the payload, also signalling load which is not explicitly depicted in FIG. 10 may be transmitted.

With reference to FIG. 10, a MME and a SGW, by their own definition as logical 3GPP entities and serving as illustrative examples for a network control entity and a network entity in general, respectively, may have access to the load attribute related to the users that they are handling. In order to collect information relating to the load attribute, related events may be monitored and the information may be stored, efficiently maintained and fetched. With regard to the SGW, the load attribute may include signalling load information, e.g. bearer setup and release related signalling, payload information, or any measures which may be obtained by monitoring the user plane packets, like bandwidth, packet sizes, how bursty the traffic comprising payload and/or signalling load is, etc. With regard to the MME, this information may include all signalling load, not only bearer setup related but also mobility related, or quality of service related not requiring bearer changes. In order to efficiently distribute users to the suitable type of the SGW as described herein, the load attribute may be the relation of payload figures and bearer related signalling load. By way of example, signalling load information known by the MME but not by the SGW may add some value, but only to a limited extent, as any signalling information not known by the SGW does by definition not have any impact on the signalling capacity of the SGW.

By way of example, the SGW may collect and communicate user-specific information to the MME using the load attribute, which can be compared with e.g. a configurable threshold in order to trigger the communication to the MME. The load attribute may comprise an amount of payload transmitted since the last S1-bearer setup or an amount of payload transmitted since e.g. the last EPS bearer setup as shown in FIG. 10, or an average throughput since the last radio bearer or EPS bearer setup, or an average payload between the last given number of S1-bearer-setup and S1-bearer-release pairs.

Furthermore, a weighted average considering some or all past bearer setup-release periods but weighting latest periods stronger may be performed, or an average throughput between the last given number of S1-bearer-setup and S1-bearer-release pairs. Furthermore, a weighted average considering all past bearer setup-release periods but weighting latest periods stronger may be performed.

According to an embodiment, the calculation of the load attribute, e.g. of a load ratio between user payload and signalling load, may be handled at the SGW. Thus, more flexibility on the obtainable data may be achieved given that the SGW has potentially access to data related to each and every payload packet, wherein the MME may only get summarized information forming the load attribute from the SGW. Further, also more possibilities for an optimized implementation, like including some part of the code directly into the payload handling functions, may be provided. The flexibility of such SGW implementation may be demonstrated upon the basis of a part of a lifetime of an EPS-bearer depicted in FIG. 10. Within the lifetime of an EPS-bearer, e.g. an EPS-bearer as defined by 3GPP TS 23.401, which may be an end-to-end bearer from the UE to the PDN-GW, the S1-U part of it may be released by the SGW and eNodeB when no traffic is foreseen on the near future, and setup again when required. This may be called within the scope of this disclosure, according to an embodiment, "bearer setup" and "bearer release", and may refer to S1-bearers as opposed to EPS-bearers which have a longer lifetime. In this regard, the eNodeB may form another embodiment of a network control entity.

Still in reference to FIG. 10 with regard to a SGW implementation, it may be feasible to calculate a number of different measures which may be useful to evaluate the appropriateness of a user to a specific architecture, i.e. whether the specific architecture supports payload intensive or signalling load intensive users. The SGW may calculate the average throughput within each S1-bearer lifetime, i.e., "T0=P0/(t1−t0)", "T1=P1/(t3−t2)", and T2. The SGGW may also calculate figures like the standard deviation of a sequence of Tn, or it can even calculate figures derived from the distribution of packets within one of the S1-bearer lifespan, e.g. from how packets belonging to P0 are received within the period t0 to t1.

By way of example, if the SGW sends the load attribute indicating the amount of payload sent within a period of time, and the first time the SGW sends this to the MME is at time t6 from FIG. 10, then, by way of example, the payload measure that the MME may obtain is Ptotal=P0−P1+P2. The MME may already have information indicating t0, t1, t2, t3, t4 and t5. However, the MME may not have any information except information as to how the traffic being determined by user communication signals belonging to Ptotal relates to each time period, so that less data can be derived than from the complete view that the SGW has. It is, however, possible to increase the amount of raw data that the SGW sends to the MME, or the frequency with which data is sent, but this comes at the important cost of additional signalling.

By way of example, the MME may determine the signalling load in order to build the ratio to the received payload measure, Ptotal, wherein also the times ti may be taken into account. Furthermore, the MME may participate on calculating the load attribute by using signalling load information already available at the MME. In this case, the payload measure may be provided to the MME which may calculate the load ratio upon the basis thereof.

Figure 11:
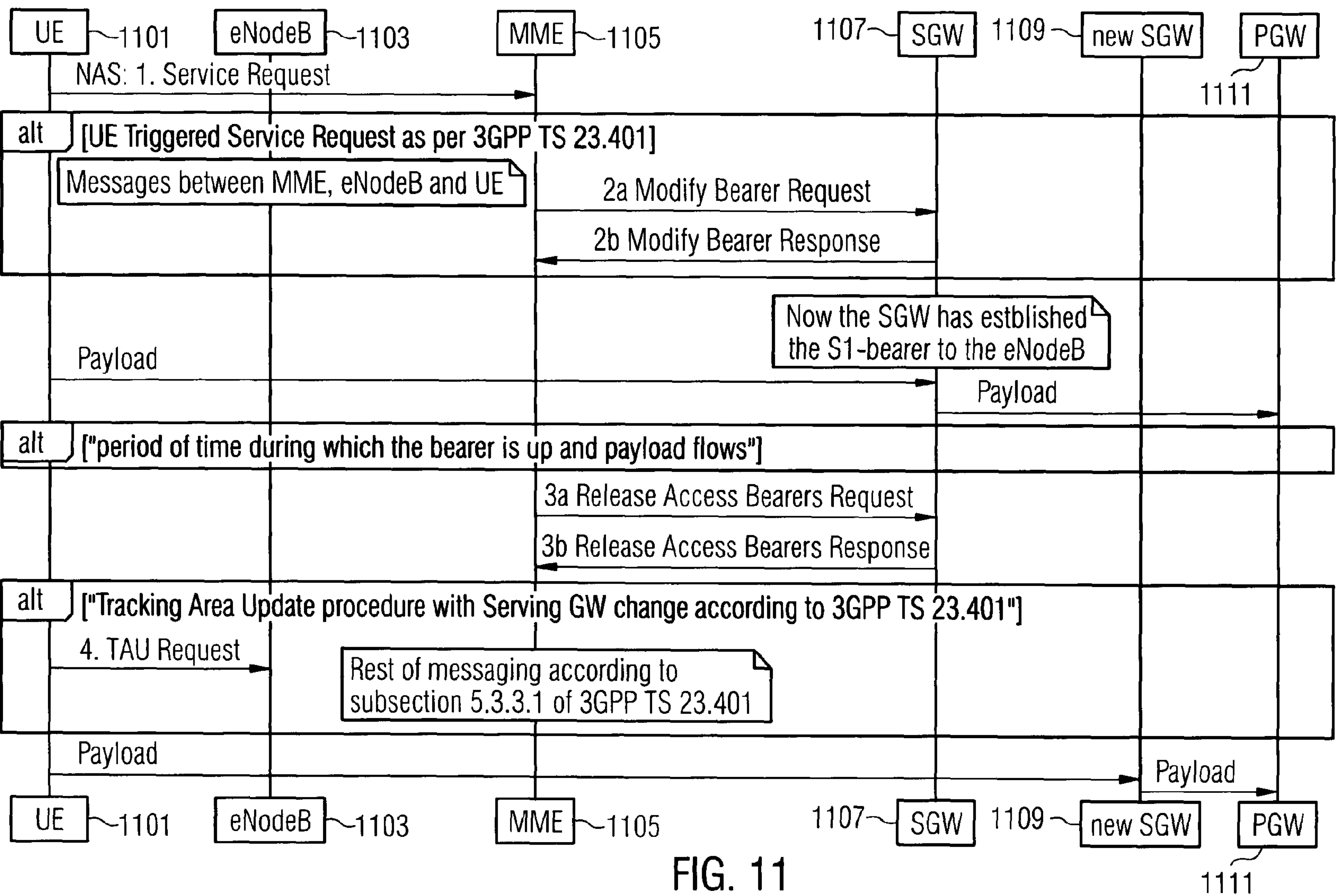
FIG. 11 shows a diagram of a relocation procedure according to an embodiment.

FIG. 11 shows a diagram demonstrating a network entity relocation procedure in an arrangement in which a MME 1105 forms an embodiment of a network control entity, a UE 1101, an eNodeB 1103, a SGW 1107, a SGW 1109 and a PGW 1111, respectively forming an embodiment of a network entity, are present.

In step 1, the UE 1101 transmits a non-access stratum message towards the MME 1105 to indicate a service request. The service request may be triggered according to the 3GPP TS 23.401 standard. In step 2*a*, the MME 1105 transmits a message towards the SGW 1107 in order to indicate a request to modify a bearer. The SGW 1107 responses to the MME 1105 in step 2*b* with a modified bearer response. After the step 2*b*, the SGW 1107 has established e.g. the S1-bearer to the eNodeB 1103. Thereafter, the user entity 1101 transmits payload towards the SGW 1107 which handles the user communication signals, the user being associated with the UE 1101. By way of example, the SGW 1107 may forward the payload towards the PGW 1111. Thus, for payload transmission, the bearer may be set up during a period of time.

Thereafter, in step 3*a*, a release access bearers request may be transmitted from the MME 1105 towards the SGW 1107 which, in step 3*b*, may transmit a release access bearer response towards the MME 1105. The release access bearer for request and response may be triggered upon the tracking area update procedure with serving network entity change according to e.g. the 3GPP TS 23.401 standard. Thereby, a network entity relocation procedure towards the SGW 1109 which may be selected for further handling the user communication signals may be initiated and executed. Thereafter, in step 4, the user entity 1101 may transmit a TAU request towards the eNodeB 1103, wherein further messaging may be performed according to the 3GPP TS 23.401 standard in order to establish a connection towards the new, selected SGW 1109. Thereafter, the new, i.e. selected SGW 1109 receives user communication signals, e.g. payload, from the user entity 1101 and forwards the payload towards e.g. the PGW 1111.

According to the signalling flow depicted in FIG. 11, the "Release Access Bearers Response" message may used by the SGW to communicate payload usage information to the MME, and where the "Tracking Area Update" procedure with serving GW change may be used by the MME 1105 to trigger the change from a payload optimized SGW to a signalling-optimized "new SGW" or vice versa.

By way of example, the signalling flow as shown in FIG. 11 may start with an "UE Triggered Service Request", for the only purpose to show an example on when the SGW 1107 sets up a new S1-bearer and can start counting the payload/throughput used by that bearer until its release. However, the signalling flow may also start with a "Network Triggered Service Request".

According to an embodiment, the 3G radio access may be applied where the MME 1105 may be replaced by a SGSN and where the S11 interface may be replaced by the S4 interface. Apart from the LTE/MME/S11 case or the 3G/SGSN/S4 case, further embodiments may be derived here from which may use different messages or sets of messages to carry the additional information, e.g. the load attribute, from the SGW 1107 to the MME/SGSN 1105.

FIG. 12 shows a block diagram of a network control entity 1200 for allocating a network entity for handling user communication signals. The network control entity 1200 may comprise a processing entity 1201 for obtaining the load attribute which may indicate a load ratio between the payload and the signalling load. The processing entity 1201 may further select a network entity upon the basis of the load attribute and to initiate a network entity location procedure to allocate the selected network entity for handling the user communication signals.

Optionally, the network control entity may comprise a data storage 1203 for storing the load attribute. Furthermore, a receiver 1205 may be provided for receiving the load attribute from a remote network entity, for example from a home subscriber server or from a network entity. In addition, the network control entity 1200 may comprise a transmitter 1207 for e.g. transmitting a location or a relocation request towards the selected network entity.

FIG. 13 shows a block diagram of a network entity 1300 for handling user communication signals of a user. The network entity 1300 may comprise a communicator 1301 for communicating a user communication signal which may be associated with signalling load and with payload. The network entity 1300 may further comprise a processing entity 1303 for determining, upon the basis of the user communication signal, a load attribute which may indicate a load ratio between the payload and the signalling load. Optionally, a data storage 1305 may be provided for storing the load attribute.

In order to transmit the load attribute towards a network control entity, e.g. towards the network control entity shown in FIG. 12, the network entity 1300 may comprise a transmitter 1305. The transmitter 1305 may be an element of the communicator 1301 or may be a separate element. Furthermore, the network entity 1300 may comprise a receiver 1309 for receiving e.g. the user communication signal. The receiver 1309 may be an element of the communicator 1301 or may be a separate element in communication with the communicator 1301.

In the following, further embodiments will exemplarily be described with respect to a MME or SGSN respectively forming an embodiment of the network entity 1200, and with respect to a SGW forming an embodiment of the network entity 1300. It is, however, to be understood, that the following embodiments generally apply to any network control entity and to any network entity unless otherwise indicated.

According to some embodiments, also user behaviours may be taken into account. In this regard, with the development of voice mobile telephony systems with broadband packet data towards the EPS (LTE/EPC) architecture, the differences in subscriber behaviours in may become an issue since e.g. different groups of users of a significant size, regardless on how the exact proportions of each of those groups may look like, may need to be handled. In the following, the different user groups are exemplarily described.

One group of users may be formed by voice calls dominant users with "traditional" telephone usage patterns. Despite of the availability of broadband, video streaming or on-line gaming, a significant amount of users are expected to keep using their phone device for a handful of voice calls per day. Assuming an average mobility, e.g. during going to work or shopping, they may be expected to generate the same signalling load as any other user group, and very little data traffic, e.g. VoIP over IMS in the long run, even no packet data at all if CS Fallback is used.

Another group of users may be formed by users of e.g. LTE/EPC as mobile broadband technology, which may include the data-card-type UEs of real persons that also belong to the previous group with another device. These users may generate an amount of payload so that their signalling load may become a smaller proportion. Nevertheless, as most of them may not be constantly using streaming applications, they may release and setup radio bearers several times per day, e.g. creating some signalling load on the SGW.

Another group of users may combine the above-mentioned user characteristics. This group can be made as small as wished by defining the payload levels that put a user into one of the above-mentioned groups.

Another group of users may be formed by users of LTE stationary devices as DSL (Digital Subscriber Line) replacement, e.g. digital divide, with no mobility and possibly more payload due to e.g. fixed workstations versus predominantly notebooks and smart phones.

Another group of users may be formed by stationary machines with low payload, like metering devices or security alarms. They may generate no mobility load, but they may have a similar proportion of bearer release/setup signalling and actual data payload.

Another group of users may be formed by stationary machines with high payload, like internet radios, TVs, which are associated with low signalling load and increased payload.

Another group of users may be formed by mobile machines, e.g. in cars or in public transportation, of the two types above. Possibly also devices embedded in some types of clothes or other not-known-yet applications may belong to this user group which is associated with additional load on the MME due to mobility and higher signalling requirements on SGW due to a bearer setup but also relocations.

In order to make the network aware of the respective group to which a user belongs, e.g. IMEISV (International Mobile station Equipment Identity and Software Version Number) may be used to identify different types of devices. This may allow identifying most of the M2M (Mobile to Mobile) devices, as well as provide an educated guess on the user preferences based on the type of device owns, e.g. an expensive smart phone versus entry level basic phone, high resolution display versus small display. Furthermore, also the user subscription may be used up to the point that an operator manages to sell different packages to different sets of users.

The examples above further serve to illustrate that a user can be a human operating a user entity such as a mobile phone or a laptop computer, or a machine comprising or connected to a user entity. The user may be identified by a user identifier, e.g. an IMSI serving to identify a subscriber of a mobile telecommunication network. Alternatively or in addition, the user entity may be identified by a user entity identifier such as e.g. an IMEI in a mobile telecommunication system.

A user identifier and/or a user entity identifier may be communicated to respective entities of the communication network such as an access node, a network control entity, a network entity handling user communication signals and/or a central data storage in order identify the user resp. the user entity at the respective entities of the communications network, especially to obtain a load attribute associated to a particular user or user entity. For example, a user identifier may be transmitted from the user entity 101 to the access node 105 via 1*a* Attach in FIG. 1 or FIG. 2 and the same user identifier or a corresponding one could be transmitted via 1*b* Attach to the network control entity 107 which in turn can send via 1*c* Attach the received user identifier or a corresponding one to the central data storage 109. The central data storage 109 may subsequently determine whether this particular user typically communicates signalling load or pay load intensive communication signals by analyzing a stored relation between said user identifier and a user characteristic with regard to signalling load or to payload intensity. For example a look-up table may relate user identities with load attributes of values "P" and "S" (or 0 and 1 or vice versa according to alternative notations). According to the example of FIG. 1, the central data storage 109 thus receives a user identifier that is related to "P" and according to FIG. 2 the received user identifier is related to "S". According to the example of FIG. 3-7, a user identity of the user of user entity 101 may be known to network control entity which may be send via the (dashed-dotted) request to the central data storage 109 according to option a). Typically, also in the case of option b), a user identity is sent from the network entity 113 to the network control entity 107 such that the network control entity 107 is adapted to initiate a relocation procedure for the user communication signals that correspond to the user identifier. In a similar manner, a user entity identifier can be communicated and processed in addition to or alternatively to the user identifier.

Despite of these mechanisms described above, there may exist subscribers, i.e. users, for which the network does not have any information on how signalling load versus payload intensive they are. By way of example, there may be subscribers whose behaviour may change after the day when they bought the contract, and there are also subscribers which may have a different behaviour on the weekends than during the week, or on vacation than during office months. Such users may dynamically be redirected towards network entities which, e.g. for a certain time period, are optimized to handle e.g. payload intensive or signalling load intensive user communication signals.

The embodiments described herein may be implemented in a 3GPP EPS architecture as e.g. described in the 3GPP TS 23.401 standard. By way of example, a UE attached to the system may have at least one EPS bearer, e.g. a default bearer, and possibly additional EPS bearers which may be used for other PDN connections or other QoS characteristics. Despite of the always-active character of some EPS bearers, a portion of the bearer between the UE and the first payload EPC entity, the SGW may not always be active. In order to save radio resources and to make the LTE scalable enough for the projected number of users, the radio bearers may be released during a network inactivity. According to an embodiment with respect to the WCDMA access scenario, also the RB and RAB release procedure may be performed. Furthermore, the RB and the RAB release procedure may be adapted to other access scenarios.

The invention claimed is:

1. A method for allocating a network entity for handling user communication signals of a user, the user communication signals comprising payload and signalling load, the method comprising:

obtaining a load attribute;

selecting a network entity based upon the load attribute, the selecting comprising:

selecting a payload optimized network entity as the selected network entity if the load attribute indicates that the user communication signals are payload intensive; or selecting a signalling load optimized network entity as the selected network entity if the load attribute indicates that the user communication signals are signalling load intensive;

initiating a network entity location procedure to allocate the selected network entity for handling the user communication signals.

2. The method of claim 1, wherein the obtaining the load attribute comprises at least one of:

receiving the load attribute over a communication network from a central data storage;

retrieving the load attribute from an internal data storage.

3. The method of claim 1, wherein the received load attribute is at least one of:

a user classification indicating whether the user communication signals of the user are signalling load intensive or payload intensive;

a payload measure of the payload;

a signalling load measure of the signalling load;

a load ratio between a payload measure of the payload and a signalling load measure of the signalling load.

4. The method of claim 1, wherein the obtaining the load attribute comprises receiving the load attribute from a current network entity which is currently handling the user communication signals.

5. The method of claim 1:

wherein the load attribute comprises a payload measure and a signalling load measure;

wherein the obtaining the load attribute comprises relating a received payload measure and a received signalling load measure to determine a load ratio.

6. The method of claim 1:

wherein the load attribute comprises a payload measure;

wherein the obtaining the load attribute comprises:

determining a signalling load measure upon the basis of the payload measure; and relating the payload measure and the determined signalling load measure to determine a load ratio.

7. The method of claim 1:

wherein the load attribute comprises a signalling load measure;

wherein the obtaining the load attribute comprises:

determining a payload measure of the payload upon the basis of the signalling load measure; and relating the received signalling load measure and the determined payload measure.

8. The method of claim 1, wherein the network entity location procedure is initiated to allocate the selected network entity upon accessing to a communication network by a user entity communicating the user communication signals.

9. The method of claim 1:

wherein the network entity location procedure is initiated to relocate the user communication signals from a current network entity which is currently handling the user communication signals towards the selected network entity;

wherein the initiating the network entity location procedure comprises:

releasing the user communication signals of the user from the current network entity that is currently handling the user communication signals for the user; and allocating the user communication signals of the user to the selected network entity.

10. The method of claim 1:

wherein the network entity location procedure is a relocation procedure for relocating the user communication signals from a current network entity which is currently handling the user communication signals towards the selected network entity;

wherein the location procedure is initiated only if the selected network entity and the current network entity are determined to be different network entities.

11. The method of claim 1, wherein the initiating the network entity location procedure comprises transmitting the load attribute towards a network control entity which is capable of performing the network entity location procedure.

12. The method of claim 1, further comprising determining whether to initiate the network entity location procedure based on the load attribute.

13. The method of claim 1 further comprising:

determining an average load attribute by averaging over a plurality of obtained load attributes;

selecting the network entity based on the average load attribute.

14. The method of claim 1, further comprising performing the network entity location procedure by a network control entity.

15. A method for handling user communication signals of a user, the method comprising:

communicating a user communication signal, the user communication signal comprising signalling load and payload;

determining a load attribute upon the basis of the user communication signal;

transmitting the load attribute towards a network control entity which is capable of initiating a network entity location procedure based on the load attribute, the transmitting being in response to:

the load attribute indicating that the user communications signals are signalling load intensive, and a network entity which is currently handling the user communication signals being optimized for payload processing; or the load attribute indicating that the user communication signals are payload intensive, and a network entity which is currently handling the user communication signals being optimized for signalling load processing.

16. The method of claim 15, wherein the load attribute comprises at least one of:

a payload measure of the payload;

a user classification indicating whether the user communication signals of the user are signalling load intensive or payload intensive;

a signalling load measure of the signalling load; and a load ratio between a payload measure of the payload and a signalling load measure of the signalling load.

17. The method of claim 15 wherein transmitting the load attribute towards the network control entity comprises transmitting the load attribute towards the network controlling entity if the load attribute fulfils a threshold criterion.

18. The method of claim 15, wherein the load attribute is transmitted in order to request a change of a network entity for handling the user communication signals.

19. The method of claim 15, wherein the load attribute is transmitted via a network interface or via a control protocol towards a network control entity.

20. The method of claim 15, wherein the load attribute is transmitted in an extension field of a transmit message frame.

21. A network control entity for allocating a network entity for handling user communication signals of a user, the user communication signals comprising payload and signalling load, the network control entity comprising processing circuitry configured to:

obtain a load attribute;

select a network entity based on of the load attribute such that the processing circuitry;

selects a payload optimized network entity as the selected network entity if the load attribute indicates that the user communication signals are payload intensive; or selects a signalling load optimized network entity as the selected network entity if the load attribute indicates that the user communication signals are signalling load intensive;

initiate a network entity location procedure to allocate the selected network entity for handling the user communication signals.

22. A network entity for handling user communication signals of a user, the network entity comprising:

a communicator configured to communicate a user communication signal, the user communication signal comprising signalling load and payload;

processing circuitry configured to determine a load attribute based on the user communication signal, the load attribute indicating a load ratio between the payload and the signalling load; and a transmitter configured to transmit the load attribute towards a network control entity which is capable of initiating a network entity location procedure based on the load attribute, the transmitter configured to transmit in response to;

the load attribute indicating that the user communications signals are signalling load intensive, and a network entity which is currently handling the user communication signals being optimized for payload processing; or the load attribute indicating that the user communication signals are payload intensive, and a network entity which is currently handling the user communication signals being optimized for signalling load processing.

23. A communication system for handling user communication signals of a user, the user communication signals comprising payload and signalling load, the communication system comprising:

a network control entity and a network entity;

the network control entity comprising processing circuitry configured to:

obtain a load attribute;

select a network entity based on of the load attribute such that the processing circuitry:

selects a payload optimized network entity as the selected network entity if the load attribute indicates that the user communication signals are payload intensive; or selects a signalling load optimized network entity as the selected network entity if the load attribute indicates that the user communication signals are signalling load intensive;

initiate a network entity location procedure to allocate the selected network entity for handling the user communication signals;

the network entity comprising:

a communicator configured to communicate a user communication signal;

processing circuitry configured to determine a load attribute based on the user communication signal, the load attribute indicating a load ratio between the payload and the signalling load of the communication signal;

a transmitter configured to transmit the load attribute towards the network control entity.

24. A computer program product stored in a non-transitory computer readable medium for controlling a computer in a communication system for allocating a network entity for handling user communication signals of a user, the user communication signals comprising payload and signalling load, the computer program product comprising software instructions which, when run on the computer, causes the computer entity to:

obtain a load attribute;

select a network entity based upon the load attribute such that the computer entity;

selects a payload optimized network entity as the selected network entity if the load attribute indicates that the user communication signals are payload intensive; or selects a signalling load optimized network entity as the selected network entity if the load attribute indicates that the user communication signals are signalling load intensive;

initiate a network entity location procedure to allocate the selected network entity for handling the user communication signals.

25. A computer program product stored in a non-transitory computer readable medium for controlling a computer in a communication system for handling user communication signals of a user, the computer program product comprising software instructions which, when run on the computer, causes the computer entity to:

communicate a user communication signal, the user communication signal comprising signalling load and payload;

determine a load attribute upon the basis of the user communication signal;

transmit the load attribute towards a network control entity which is capable of initiating a network entity location procedure based on the load attribute, the transmitting being in response to:

the load attribute indicating that the user communications signals are signalling load intensive, and a network entity which is currently handling the user communication signals being optimized for payload processing; or the load attribute indicating that the user communication signals are payload intensive, and a network entity which is currently handling the user communication signals being optimized for signalling load processing.

* * * * *